United States Patent [19]

Arnarson

[11] Patent Number: 5,582,283
[45] Date of Patent: Dec. 10, 1996

[54] AUTOMATIC INFEEDER DEVICE

[75] Inventor: Hordur Arnarson, Reykjavik, Iceland

[73] Assignee: Marel Ltd, Iceland

[21] Appl. No.: 242,956

[22] Filed: May 16, 1994

[51] Int. Cl.$^6$ .................................................. B65G 47/10
[52] U.S. Cl. ........................ 198/357; 198/463.6; 198/451
[58] Field of Search ................................ 198/357, 418.2, 198/451, 448, 463.6

[56] References Cited

U.S. PATENT DOCUMENTS

| | | | |
|---|---|---|---|
| 2,470,922 | 5/1949 | Dunn | 198/357 |
| 3,235,101 | 2/1966 | Milhaupt | 198/451 X |
| 3,815,723 | 6/1974 | Wright et al. | 198/357 |
| 4,010,841 | 3/1977 | Bonzack | 198/357 |
| 4,043,442 | 8/1977 | Greenwell et al. | 198/463.6 X |
| 4,240,538 | 12/1980 | Hawkes et al. | 198/451 X |
| 4,494,644 | 1/1985 | Rizzo, Sr. | 198/463.6 X |
| 4,792,033 | 12/1988 | Iwata et al. | 198/357 |

FOREIGN PATENT DOCUMENTS

| | | | |
|---|---|---|---|
| 1455775 | 11/1976 | United Kingdom | 198/357 |

*Primary Examiner*—D. Glenn Dayoan
*Attorney, Agent, or Firm*—Cushman Darby & Cushman, LLP

[57] ABSTRACT

An apparatus and method for depositing objects at separated locations on a movable belt. The device includes at least one channel through which objects enter the apparatus. Each channel includes a plurality of gates disposed along the channel. These gates operate sequentially to incrementally move the objects individually through the channel towards the movable belt. A sensor locates empty spaces along the movable belt, into which the objects are deposited. The movable belt is usually part of a conveyor system and may be a slotted belt or a smooth belt.

13 Claims, 1 Drawing Sheet

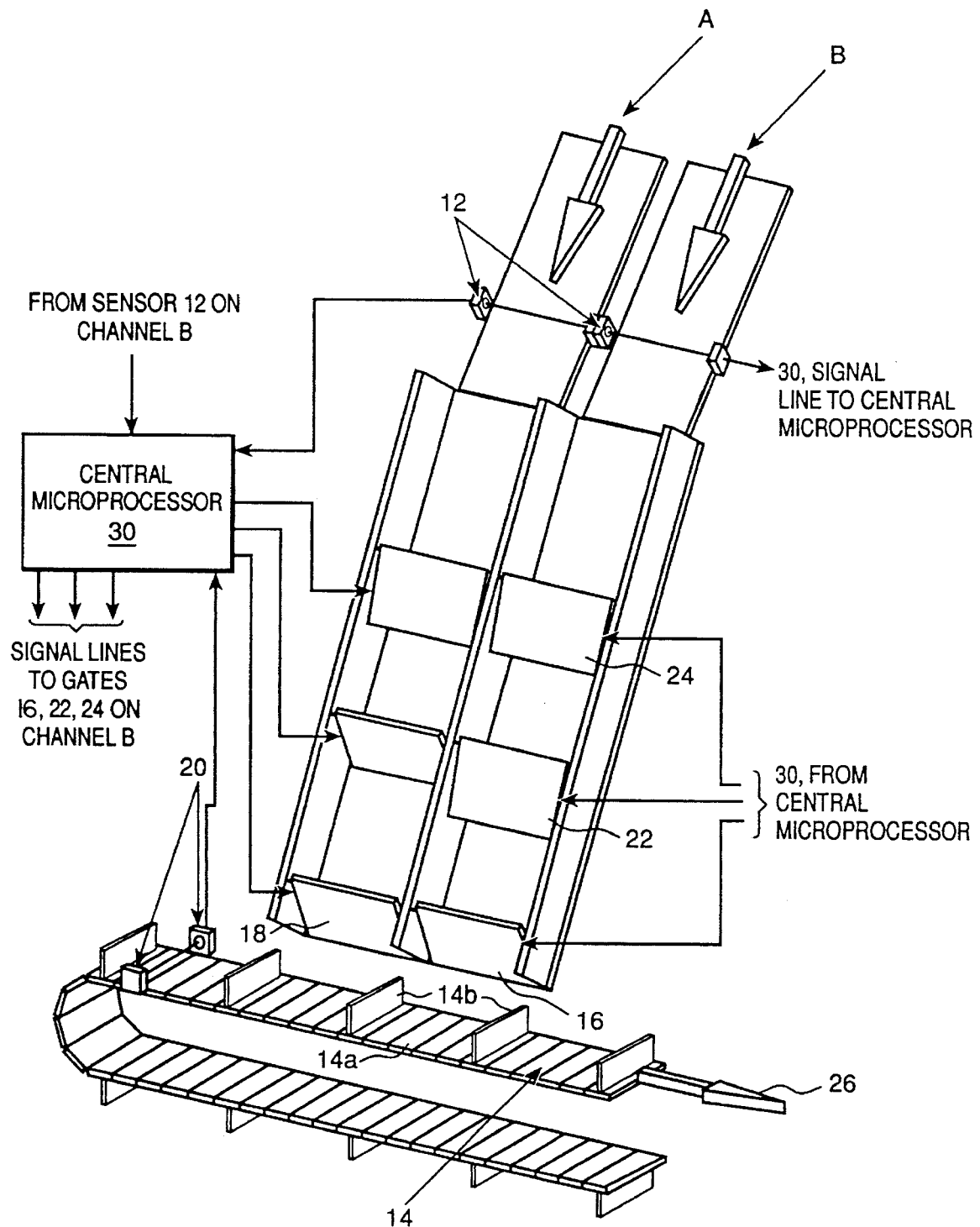

AUTOMATIC INFEEDER DEVICE

BACKGROUND OF THE INVENTION

1. Field of the Invention

The present invention relates to a device for inputting objects to a system. More particularly, the present invention relates to a device for organizing objects from a conveyor on a movable belt.

2. Description of the Related Art

In feeding systems such as those used in conjunction with grading equipment that classifies objects based on either weight or appearance (such as computer-vision systems), it has been necessary for the individual objects to be fed to the equipment in a single line with a certain minimum distance between adjacent objects to ensure an accurate classification of the objects and also to provide the ability to direct the object to a desired location after it has been classified. The objects usually have a random orientation when fed to the system.

Today, one manner of accomplishing this single-line infeeding is to have an operator manually feed the objects to a feeding system or directly to a grading system. Such manual infeeding is labor-intensive and correspondingly very expensive. It is also easy for an operator to be careless and deposit more than a single object at a time to a grading system, thus producing errors in correct grading of the objects. As a result, feeding speed is limited.

SUMMARY OF THE INVENTION

The goal of the present invention is to overcome the problems with manual infeeding by providing a system that automatically feeds grading equipment or other equipment where it is necessary to have the objects separated from one another. In this manner, labor costs are decreased and processing speeds can be increased.

The present invention is an apparatus and method for effectively organizing objects to be placed on a movable belt. The present invention ensures that objects are deposited at separated locations on the belt.

The present invention is directed to an apparatus that inputs objects to a conveyor system, including at least one channel, having an exit therefrom, with the objects entering the apparatus and moving toward the exit to the conveyor system. The system also includes means for determining the presence of the objects in the channel. Disposed in the channel are means for controlling flow through the channel and allowing each object to exit the channel individually through the exit and to be deposited in a predetermined area on the conveyor system.

The present invention is also directed towards the method of depositing objects on a movable belt. Objects move through at least one channel having a plurality of gates disposed therealong. The objects move toward an exit from the channel toward the movable belt, with the movement of the objects being controlled by the gates in the channel. The presence of objects in the channel is sensed by a sensor disposed along the channel. Positions for objects along the movable belt are sensed by a sensor disposed along the movable belt. The objects are moved through the channel by sequentially opening and closing each of the gates, starting with the gate closest to the movable belt and advancing towards an entrance to the channel. One object is deposited in an appropriate position on the movable belt separated from other objects. The entire process is repeated until all objects have been deposited on the movable belt.

BRIEF DESCRIPTION OF HE DRAWING

Other objects, features, and characteristics of the present invention, as well as the methods of operation and functions of the related elements of the structure, and to the combination of parts and economies of manufacture, will become apparent upon consideration of the following description and the appended claims with reference to the accompanying drawing, all of which form a part of this specification. In the drawing, the FIGURE is a perspective view of the preferred embodiment of the present invention.

DETAILED DESCRIPTION OF THE PRESENTLY PREFERRED EXEMPLARY EMBODIMENT

The present invention, as depicted in the FIGURE, includes a first channel A and a second channel B. It is also possible to have any other number of channels. For example, one to six channels, or even more, may be employed. Disposed along each channel is sensor 12 for determining the presence of an object in the channel. Each of the objects being input to channels A and B are to be deposited in one of the individual spaces 14a between dividers 14b on slotted belt 14. Of course, belt 14 need not be slotted with dividers as shown in the FIGURE. It is possible that belt 14 be a smooth belt. Sensor 20 senses the presence of dividers 14b along belt 14, with the dividers indicating the position of spaces 14a. Sensor 20 could also be used to locate empty spaces by sensing the presence or absence of objects in the spaces 14a.

Of course, it is possible to use more than a single sensor along each channel. Sensors could be disposed between adjacent gates to signal when an object is present therebetween. Such sensors could be used to more accurately control opening and closing of gates 18, 22, and 24. Sensors between gates would ensure that only a single object was trapped between adjacent gates. Furthermore, such sensors could be used to determine the speed of the objects passing through the channels, and thus more effectively control opening and closing of the gates.

Each of channels A and B includes a plurality of gates disposed therealong. In the embodiment shown in the FIGURE, three gates 18, 22, and 24 are used, but anywhere from two to five gates, or more, may be used in each channel. The preferred number of gates is between two and five, with the number depending upon such factors as the rapidity of objects being input to channels A and B, the speed of slotted belt 14, etc. Gate 18, in each channel, blocks lower end 16 of each channel. Gates 22 and 24 are disposed sequentially between gate 18 and sensor 12.

In the preferred embodiment, channels A and B are inclined so that objects move via gravity towards lower end 16. It is also possible that the channels be horizontal. In such an embodiment, means must be provided to move the objects towards belt 14. The means for moving the objects is, for example, a conveyor belt disposed in each channel. It is also possible, in the horizontal design, to eliminate the gates and instead using a plurality of conveyor belts disposed along each channel. The channels may also be vertical.

Gates 18, 22 and 24 are controlled by central microprocessor 30. Central microprocessor 30 receives signals from sensors 12 and 20, with the signals from sensors 20 identifying dividers 14b on slotted belt 14 and signals from sensors 12 alerting central microprocessor 30 to the entry of objects into channels A and B. Central microprocessor 30 outputs signals to the gates 18, 22 and 24 disposed in each channel A and B, with the signals to the gates controlling the opening and closing thereof.

In the preferred embodiment of the present invention, sensors 12 and 20 are optical sensors. However, other type of sensors are also possible, such as capacitive/magnetic sensors, ultrasonic sensors or force sensors.

The operation of the above system will now be described. Objects are fed to channels A and B in the direction of the arrows along channels A and B. In most cases, the objects are fed to the channels on a conveyor system (not pictured) in such a manner that the objects arrive as a single layer and not on top of one another.

Objects in channels A and B are detected by sensor 112, which signals the presence of each object to central microprocessor 30. The first object to enter a channel will proceed unimpeded all the way to gate 18, which is closed. The second object to enter the same channel will only go as far as gate 22, which closes after an object is impeded by gate 18. Gate 24 closes once an object rests against gate 22. Central microprocessor 30 controls gates 18, 22 and 24 so as to allow only a single object to access the space between adjacent gates.

Slotted belt 14 continuously runs proximate gate 18, so that when gate 18 opens, the object disposed next to gate 18 will be deposited to a space 14a between adjacent dividers 14b. The opening of gate 18 is controlled by sensor 20 detecting an empty space between dividers 14b and signalling the presence of same to central microprocessor 30. If sensor 20 determines that an object is already present in a space on slotted belt 14, gate 18 will not open, and thus, the present invention will prevent more than a single object form being deposited in any space on slotted belt 14.

Once gate 18 opens and the object is deposited on slotted belt 14, gate 18 closes, and gates 22 and 24 are sequentially operated so as to advance objects trapped therebehind one gate closer to slotted belt 14. That is, an object trapped behind gate 22 advances so that it is now behind gate 18 and an object trapped behind gate 24 advances to being behind gate 22. Objects in all channels, in this case, both A and B, are advanced by the sequential opening of gates 18, 22 and 24, until the object attains a position on slotted belt 14.

Slotted belt 14 runs in the direction of arrow 26. As noted above, a single object is positioned in each space on slotted belt 14 by the sequential operation of gates 18, 22 and 24 by central microprocessor 30. It is also possible that belt 14 be a smooth conveyor-type belt. In such an embodiment, gate 18 would function so as to open at specific time intervals timed with movement of the belt in order to deposit one object in a specified range or length of belt 14.

Both channels A and B operate in the same manner. That is, gates 18, 22 and 24 in each channel are sequentially operated so as to advance objects in both channels toward slotted belt 14. In the pictured embodiment, sensor 20 could signal central microprocessor 30 whenever two consecutive empty spaces 14a are detected. Then, microprocessor 30 signals to gate 18 in both channels A and B, opening the gates and depositing objects in the two consecutive open spaces. However, with such operation, it is possible to allow spaces 14a to remain empty should one of channels A and B be empty.

Alternatively, as microprocessor 30 receives an indication from sensor 20 of each empty space, microprocessor 30 determines which channel has the greatest number of objects therein by determining how many gates are closed in each channel. The channel with the most closed gates has the most objects therein waiting to be fed onto movable belt 14. Microprocessor 30 will control the gates in the channel with the most objects to sequentially open, as described above, to deposit an object from the channel to the identified empty space.

It is also possible that sensor 20 is not necessary if it is known that spaces 14a between dividers 14b will be empty as slotted belt 14 moves past lower end 16 of channels A and B. In such an embodiment, the opening of gates 18 is keyed to the speed of belt 14.

This invention has been described with reference to what is currently considered to be the most practical and preferred embodiment. However, this is not meant to limit the present invention. Rather, various modifications and arrangements are intended to be included within the spirit and scope of the appended claims.

What is claimed is:

1. An apparatus for inputting objects to a conveyor system, comprising:

at least one linear channel feeding said conveyor system and having an exit therefrom, with said objects moving along said channel toward said exit to said conveyor system, each said at least one channel having a flat basewall and first and second sidewalls generally perpendicular to said basewall for defining with the basewall channel passage for said objects;

means for determining presence of said objects in said channel; and means for allowing said objects to exit said channel individually in a manner such that said objects undergo linear movement as said objects pass through said exit and are deposited on said conveyor system as the result of said linear movement at separated locations, wherein said means for allowing comprises at least two gates spaced from one another along the length of the channel for selectively allowing and selectively preventing movement of said objects along said channel passage.

2. An apparatus as claimed in claim 1, wherein said allowing means includes means for sequentially controlling opening and closing of said gates so as to progressively move said objects toward said conveyor system.

3. An apparatus as claimed in claim 2, wherein said controlling means controls said gates so that one object is trapped between adjacent gates in each channel.

4. An apparatus as claimed in claim 2, wherein said allowing means includes from two to five gates.

5. An apparatus as claimed in claim 1, wherein said determining means includes at least one sensor disposed along said channel.

6. An apparatus as claimed in claim 5, wherein said sensor is disposed at an entrance to said channel.

7. An apparatus as claimed in claim 5, wherein said sensor is an optical sensor.

8. An organizing apparatus comprising:

a movable belt;

at least one channel, each said at least one channel having a flat basewall and first and second sidewalls generally perpendicular to said basewall for defining with the basewall a channel passage for said objects;

a first sensor for determining presence or absence of objects in said channel;

a second sensor for locating empty spaces on said movable belt; and means, responsive to said first sensor and said second sensor for individually depositing said objects on empty spaces of said movable belt, wherein said means for individually depositing said objects operates so as to linearly move said objects from said channel to said movable belt, said means for individually depositing said objects on said moveable belt including at least two gates disposed at spaced locations along a length of the respective channel, for selectively permitting and selectively preventing deposit of said objects, said gates operating sequentially.

9. An apparatus as claimed in claim 8, wherein:

said gates include an exit gate disposed proximate said movable belt; and said depositing means includes means for opening said exit gate in response to said second sensor locating an empty space on said movable belt.

10. An apparatus as claimed in claim 8, wherein said first sensor and said second sensor are optical sensors.

11. An apparatus as claimed in claim 8, wherein said apparatus comprises from two to five gates.

12. An apparatus for depositing objects on a conveyor, comprising:

a plurality of channels feeding said conveyor, each said channel comprising a basewall and first and second sidewalls, said basewall being substantially planer and defining with said sidewalls a channel passage for objects;

a plurality of gates disposed within each channel, said gates selectively permitting and selectively preventing passage of objects;

a sensor disposed in each channel for determining a presence of objects therein;

a sensor disposed on said conveyor for locating empty spaces on said conveyor; and control means for monitoring said sensor disposed on said conveyor and said sensor disposed in said channel to control opening and closing of said gates to permit only one object to be between adjacent gates and to control deposit of said objects into said empty spaces on said conveyor;

wherein said objects are deposited by linear motion thereof from said channels onto said conveyor.

13. A method for individually depositing objects on a movable belt, said method comprising the steps of:

moving objects through at least one channel having a plurality of gates disposed there along, the objects moving toward an exit from the channel to the movable belt each said channel having a generally flat basewall and first and second sidewalls for defining a channel passage with said basewall, said plurality of gates being spaced along said respective channel for selectively permitting and selectively preventing movement of objects along said channel, each said channel being inclined and receiving at one end thereof objects from a conveyor and being disposed in operative communication with the moveable belt at the other end thereof;

sensing the presence of objects in the channel using a sensor disposed along the channel;

sensing empty spaces along the movable belt using a sensor disposed along the movable belt;

sequentially opening and closing each of the gates, starting with the gate closest to the movable belt and advancing towards an entrance to the channel, thus moving the objects toward the exit; and depositing an object in an empty space on the movable belt, with said objects being moved linearly from said channel to said conveyor.

* * * * *